United States Patent
Truong et al.

(10) Patent No.: US 7,477,068 B2
(45) Date of Patent: Jan. 13, 2009

(54) SYSTEM FOR REDUCING CROSS-TALK INDUCED SOURCE SYNCHRONOUS BUS CLOCK JITTER

(75) Inventors: Bao G. Truong, Austin, TX (US); Daniel Mark Dreps, Georgetown, TX (US); Anand Haridass, Austin, TX (US); John C. Schiff, Round Rock, TX (US); Joel D. Ziegelbein, Iowa City, IA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/058,689

(22) Filed: Mar. 29, 2008

(65) Prior Publication Data

US 2008/0175327 A1    Jul. 24, 2008

Related U.S. Application Data

(63) Continuation of application No. 11/611,200, filed on Dec. 15, 2006, now Pat. No. 7,382,151.

(51) Int. Cl.
*H03K 17/16* (2006.01)

(52) U.S. Cl. .............................. 326/27; 326/82; 326/93

(58) Field of Classification Search .................. 326/26, 326/27, 82–87, 93–98
See application file for complete search history.

(56) References Cited

U.S. PATENT DOCUMENTS

| | | | | |
|---|---|---|---|---|
| 6,058,496 A | * | 5/2000 | Gillis et al. .................. | 714/727 |
| 7,233,170 B2 | * | 6/2007 | Becker et al. .................. | 326/93 |
| 2001/0021953 A1 | | 9/2001 | Nakashima ..................... | 710/5 |
| 2003/0229481 A1 | | 12/2003 | Wu et al. ....................... | 703/14 |
| 2005/0259692 A1 | | 11/2005 | Zerbe .......................... | 370/503 |
| 2006/0158225 A1 | | 7/2006 | Stojanovic et al. ............ | 326/87 |
| 2007/0046335 A1 | | 3/2007 | Becker et al. .................. | 326/93 |

FOREIGN PATENT DOCUMENTS

| JP | 2005-014157 | 1/1993 |
|---|---|---|
| JP | 2004-362391 | 12/2004 |

* cited by examiner

*Primary Examiner*—Don P Le
(74) *Attorney, Agent, or Firm*—Casimer K. Salys; Winstead, P.C.

(57) ABSTRACT

A first clock signal of frequency F is used to couple data to an off-chip driver (OCD) using a master/slave flip flop (FF), wherein the master latch is clocked with the first clock signal and the slave latch is clocked with the complement of the first clock signal. A second clock signal of frequency F/2 is generated from the first clock signal. The second clock signal is shifted a time equal to substantially one-half the cycle of the first clock signal. In one embodiment, the second clock is shifted using a delay line circuit. In another embodiment, the second clock is shifted using a master/slave FF, wherein the master latch is clocked with the complement of the first clock signal and the slave latch is clocked with the first clock signal. The logic state transitions of the data between edges of the propagating clock thereby reducing coupling to the clock transitions and thus reducing edge jitter.

9 Claims, 9 Drawing Sheets

SYSTEM FOR REDUCING CROSS-TALK INDUCED SOURCE SYNCHRONOUS BUS CLOCK JITTER

CROSS REFERENCE TO RELATED APPLICATIONS

The present application is a continuation application of U.S. patent application Ser. No. 11/611,200, which was filed on Dec. 15, 2006, which is assigned to the assignee of the present invention. The present application claims priority benefits to U.S. patent application Ser. No. 11/611,200.

TECHNICAL FIELD

The present invention relates in general to off-chip transmission line drivers and receivers, and in particular, to methods for reducing transition induced cross-talk edge jitter in source synchronous clock systems.

BACKGROUND INFORMATION

Digital computer systems have a history of continually increasing the speed of the processors used in the system. As computer systems have migrated towards multiprocessor systems, sharing information between processors and memory systems has also generated a requirement for increased speed for the off-chip communication networks. Designers usually have more control over on-chip communication paths than for off-chip communication paths. Off-chip communication paths are longer, have higher noise, impedance mismatches, and have more discontinuities than on-chip communication paths. Since off-chip communication paths are of lower impedance, they require more current and thus more power to drive.

When using inter-chip high-speed signaling, noise and coupling between signal lines (crosstalk) affects signal quality. One way to alleviate the detrimental effects of noise and coupling is through the use of differential signaling. Differential signaling comprises sending a signal and its complement to a differential receiver. In this manner, noise and coupling affect both the signal and the complement equally. The differential receiver only senses the difference between the signal and its complement as the noise and coupling represent common mode signals. Therefore, differential signaling is resistant to the effects that noise and crosstalk have on signal quality. On the negative side, differential signaling increases pin count by a factor of two for each data line. The next best thing to differential signaling is pseudo-differential signaling. Pseudo-differential signaling comprises comparing a data signal to a reference voltage using a differential receiver or comparator.

When high speed data is transmitted between chips, the signal lines are characterized by their transmission line parameters. High speed signals are subject to reflections if the transmission lines are not terminated in an impedance that matches the transmission line characteristic impedance. Reflections may propagate back and forth between driver and receiver and reduce the margins when detecting signals at the receiver. Some form of termination is therefore usually required for all high-speed signals to control overshoot, undershoot, and increase signal quality. Typically, a Thevenins resistance (equivalent resistance of the Thevenins network equals characteristic impedance of transmission line) is used to terminate data lines allowing the use of higher valued resistors. Additionally, the Thevenins network is used to establish a bias voltage between the power supply rails. In this configuration, the data signals will then swing around this Thevenins equivalent bias voltage. When this method is used to terminate data signal lines, a reference voltage is necessary to bias a differential receiver that operates as a pseudo-differential receiver to detect data signals in the presence of noise and crosstalk.

The logic levels of driver side signals are determined by the positive and ground voltage potentials of the driver power supply. If the driver power supply has voltage variations that are unregulated, then the logic one and logic zero levels of the driver side signals will undergo similar variations. If the receiver is substantially remote from the driver such that its power supply voltage may undergo different variations from the driver side power supply, then additional variations will be added to any signal received in a receiver side terminator (e.g., Thevenins network). These power supply variations will reduce noise margins if the reference has variations different from those on the received signals caused by the driver and receiver side power supply variations.

The popular technique of source-synchronous clocking is often used for high speed interface systems. With this technique, the transmitting device sends a clock with the data. The advantage of this approach is that the maximum performance is no longer computed from the clock-to-output delay, propagation delay, and set up times of the devices and the circuit board. Instead, the maximum performance is related to the maximum edge rate of the driver and the skew between the data signals and the clock signals. Using this technique, data may be transferred at a 1 Gbps rate (1-nsec bit period) even though the propagation delay from transmitter to receiver may exceed one nanosecond. If standard double-data rate (DDR) driving is utilized, data is launched on both the rising and falling edges of the clock. In this case, duty cycle symmetry of the clock as detected at the receiver becomes important since each edge of the clock is also used to recover the data at the receiving end of the data path. If the clock is asymmetrical, then it will affect the eye pattern of the data signals that the clock is used to detect.

In high speed data transmission across a densely routed multi-chip module (MCM) package, the clock and data signals may be experience considerable coupling between parallel lines. This noise coupling reduces the fidelity of the data signals and adds edge jitter to the clock signals. These factors may limit the data rate of the chip to chip interfaces. In order to transmit error-free data across the chip to chip interface, either the signaling rate or the amount of coupling between signaling lines must be reduced. Reducing data rate is usually not desirable since it reduces the ability of the system to meet performance targets. Therefore, to maintain an acceptable data rate the coupled noise must be reduced for error-free operation.

Typical methods of cross-talk reduction including introducing "shield" traces between signals in the package or adding more space between the signal lines. This approach are less than optimal because it forces the reduction in the number of usable signals that may be routed between chips thereby again compromising the ability of the system to meet bandwidth targets. These methods fail in part because the decrease in coupled noise does not warrant the increase in expensive MCM area required.

Of particular concern, is noise coupled to the clock edges when a source synchronous clock is launched in phase with its associated data. In this case, there is opportunity for data transitions to interact with clock edge transitions over the interface path resulting in clock edge jitter. Clock edge jitter will adversely affect the eye pattern for all data signals clocked with the received source clock. The received source clock and data signals will be aligned at the receiving chip but the clock edge jitter will remain causing a degradation in margins affecting error rates.

There is, therefore, a need for a method of reducing coupling between the edge transitions of a source clock signal and adjacent synchronous data signals.

SUMMARY OF THE INVENTION

In a source synchronous interface, the clock and data signals are launched simultaneously from a driving chip to a receiving chip. There may be a large number of closely spaced signals lines on a multi-chip module containing several IC chips that are coupled with communication buses. One type of cross-talk occurs when an aggressor data signal switches and couples switching noise onto an adjacent clock signal. Since the data and clock edges are aligned, the coupled noise will affect edges of the clock signal resulting in the clock edges being shifted forward or backward depending whether the coupling occurs on a rising or falling edge of the data signal.

Embodiments of the present invention purposely shift the propagating clock signal one-half clock cycle of the source clock that generates the data signal edges at each same polarity source clock edge. Thus the propagating clock is purposely shifted one-fourth of its clock cycle relative to the data signal edges. In this manner, noise coupled from propagating data signals to propagating clock signals only occur during either the logic one or logic zero clock state and not when the propagating clock is transitioning between logic states. When the propagating clock is received at the receiver chip, it is re-aligned with the data signals before it is used to sample the received data. The cross-talk induced jitter in the propagating clock is reduced resulting in higher reliability communication between IC chips.

In one embodiment, a select signal may be used to propagate either the shifted or un-shifted clock signal. A variety of circuits may be used to generate the delayed or shifted clock signal.

A main clock of frequency F is used to launch data signals such that data transitions occur synchronous with the one edge of the source clock. A source clock with a frequency F/2 is generated from the main clock. A propagating clock is coupled to an off-chip driver by clocking the source clock with the main clock such that the propagating clock is shifted one-half cycle of the main clock. The propagating clock has edge transitions that occur half way between data transitions of an alternating one/zero logic pattern. In this manner, any coupling between the propagating clock and an adjacent data signal will occur at static logic levels of either signal. Since coupling does not occur during edges of the propagating clock signal, its edge jitter is reduce thereby improving the eye diagram of received data clocked by the received propagating clock signal.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
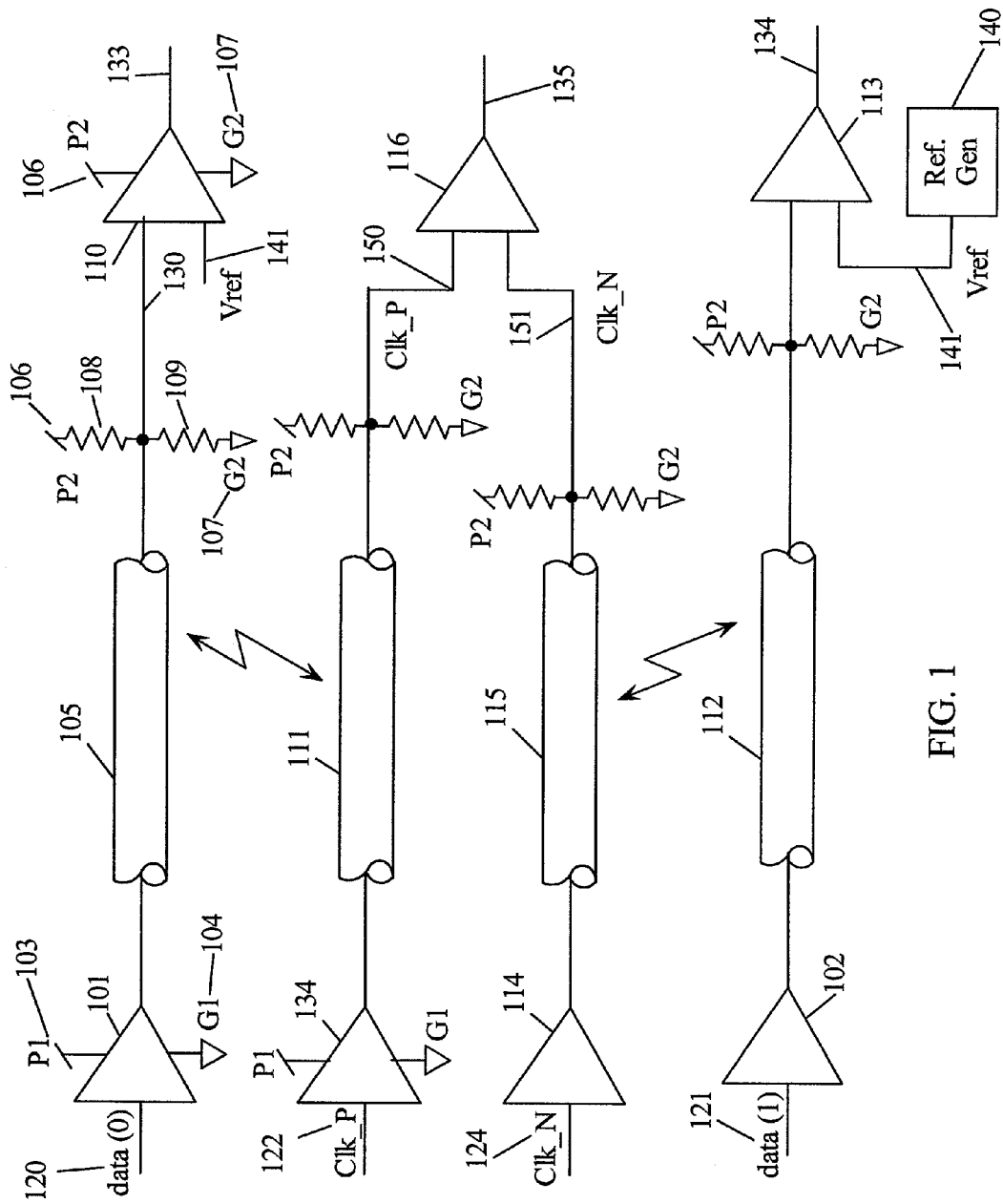
FIG. 1; is a circuit diagram of a clock and data transmission path.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a circuit diagram of typical pseudo-differential signaling suitable for practicing embodiments of the present invention where data is transmitted from a driver to a receiver on transmission line 105 parallel to a differential clock signal transmitted on transmission lines 111 and 115. Exemplary reference generator (RG) 140 is used to generate a single reference voltage (e.g., Vref 141) for multiple receivers (e.g., 110 and 113). Drivers 101 and 102 represent two of a number of N drivers sending data to receivers 110 and 113, respectively. Exemplary driver 101 receives a data signal 120 and generates a propagating data signal as an output. Exemplary transmission line 105 may be terminated with a voltage divider comprising resistors 108 and 109 as shown. Exemplary receiver input 130 has a DC bias value determined by the voltage division ratio of resistors 108 and 109 and the voltage between P2 106 and G2 107. Exemplary receiver 110 is powered by voltages P2 106 and G2 107 which may have different values from P1 103 and G1 104 due to distribution losses, noise coupling, and dynamic impedance of the distribution network. Exemplary receiver 110 is typically a voltage comparator or high gain amplifying means that amplifies the difference between a signal at input 130 and a reference voltage 141. In this circuitry, driver side noise will not be reduced by common mode rejection as the reference voltage (e.g., Vref 141) does not contain driver side noise but rather reflects noise of the receiver side.

A clock signal Clk_P 122 and its complement Clk_N 124 are coupled to transmission lines (TL) 111 and TL 115 with off-chip drivers 134 and 114, respectively. The clock signals Clk_P 122 and Clk_N 124 are received as Clk_P 150 and Clk_N 151 in a differential receiver 116. Differential receiver circuitry 116 generates a single ended signal at output 135 which may then be buffered for distribution within an IC. During transmission, there is capacitive coupling between the data signals and the clock signals. Since integrity of the clock edges are the most important parameter, any noise that couples during clock transitions may the most damaging.

Figure 2:
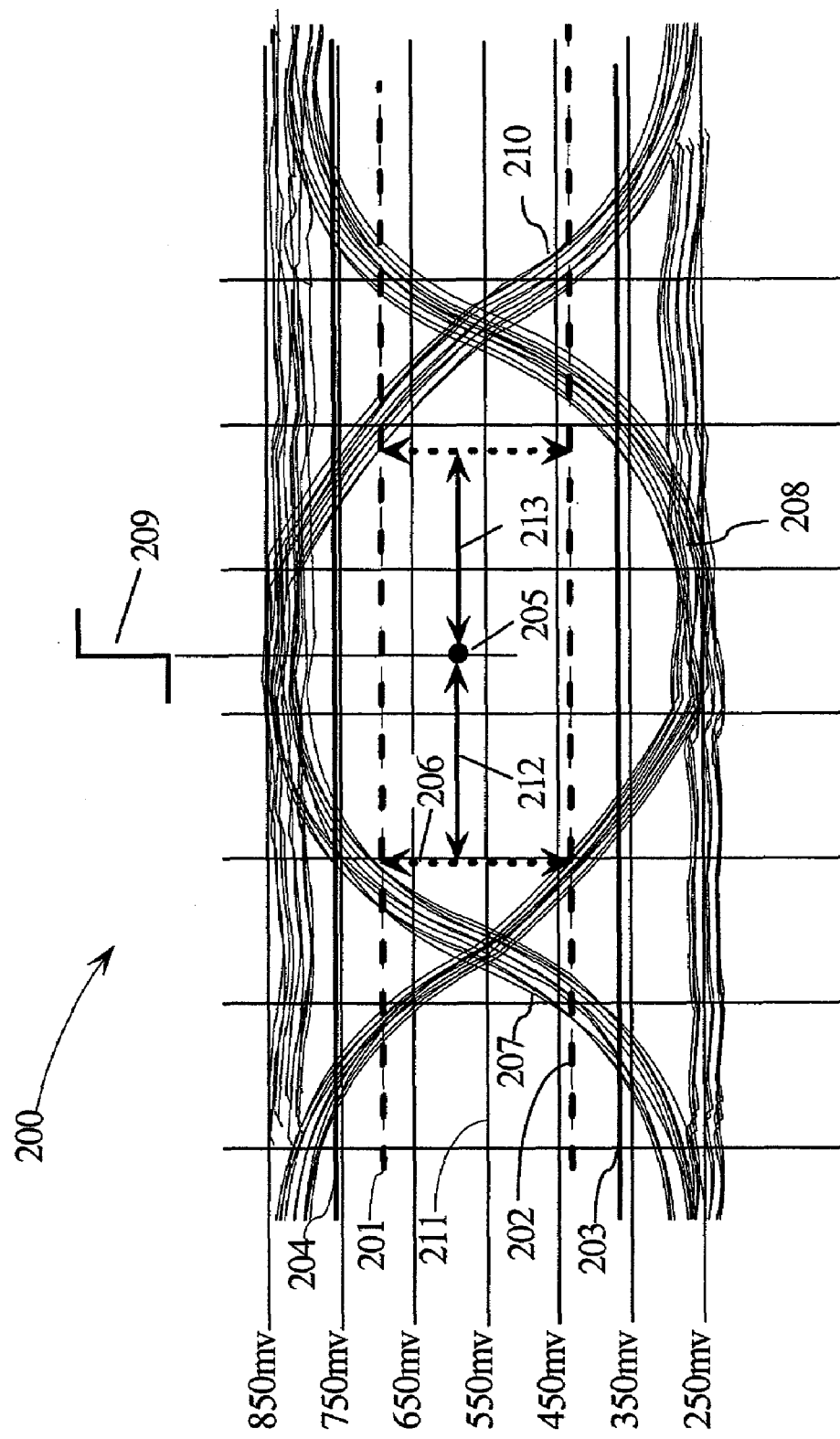
FIG. 2; illustrates an eye diagram used to quantify signal quality.
Figure 3:
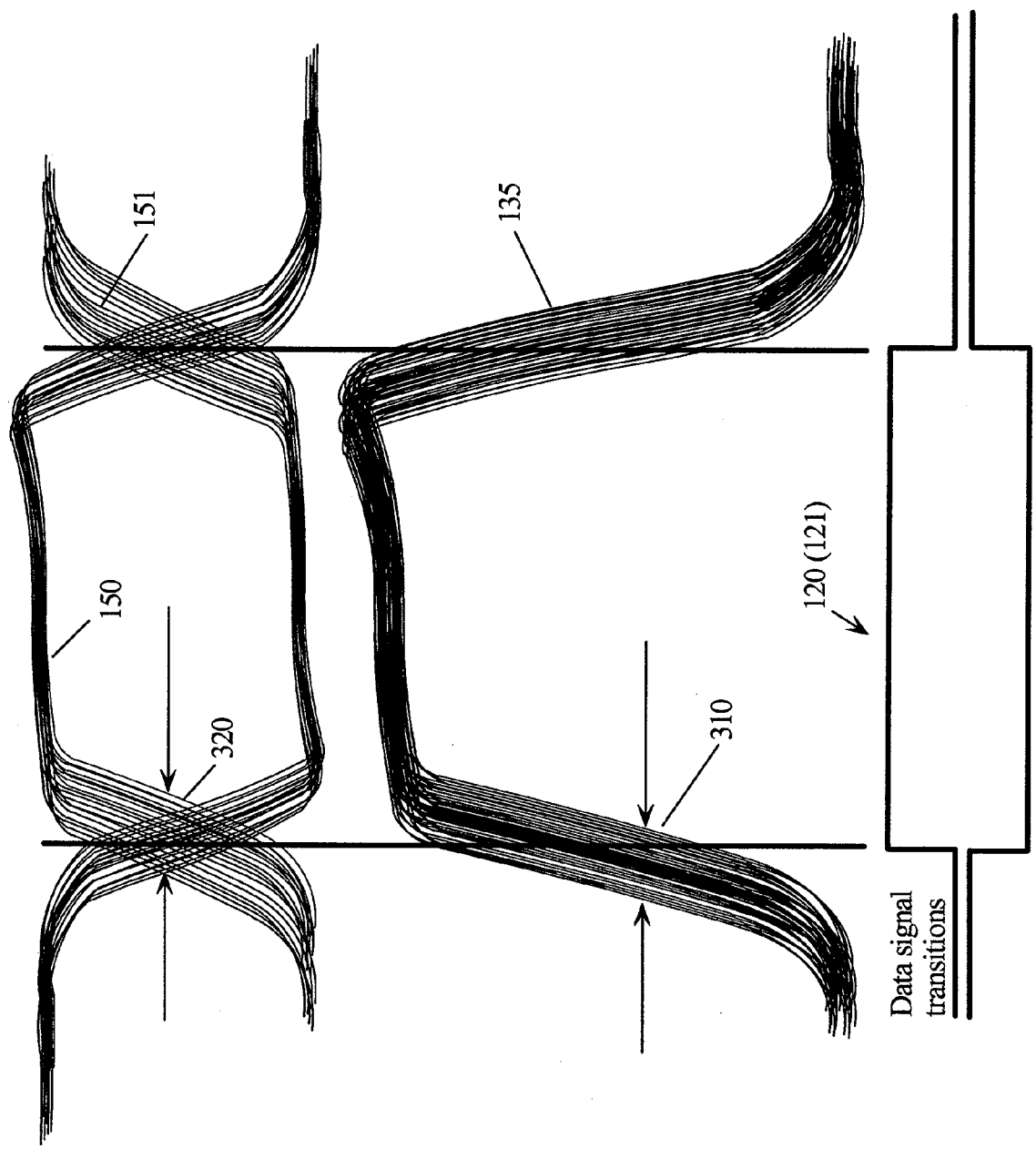
FIG. 3; illustrates clock waveforms that have edge coupling from a data signal

Various signal characteristics may be monitored in determining what metric to use in setting an optimum value of variables affecting an eye pattern 200. FIG. 3 illustrates a superposition of many received signals (e.g., at node 133) from a transmission line (TL) (e.g., TL 105). FIG. 2 illustrates what is meant by the "eye window" of a waveform as discussed in embodiments of the present invention. If one alternates between sending a repetitive signal and its complement, then a time lapse oscillograph of received waveforms would show that the waveform transitions between a logic one and a logic zero actually vary (e.g., positive transitions 207 and negative transitions 210). The actual voltage levels corresponding to a logic one (209) and a logic zero (208) also show dynamic variances. The voltage value of the "eye window" is illustrated by arrow 206 between voltage levels 201 and 202 and the time value is illustrated by arrows 212 and 213 between the transitions above voltage levels 201 and 202. Voltage level 201 illustrates the voltage above where a received signal is defined as a logic one and level 202 illustrates the voltage below where a received signal is defined as a logic zero. The crossover point 211 (voltage 550 mv) may be an ideal threshold voltage for a receiver detecting waveforms 200. The voltage between 201 and 211 may be called the positive signal-to-noise margin and the voltage between 211 and 202 may be called the negative signal-to-noise margin. Noise margins may be one way to determine an optimum value to use to set a reference voltage (e.g., Vref 141) for detecting a pseudo-differential signal generated at a receiver output (e.g., 223).

If the data was sampled by a clock transition 209, it would be ideal to have the clock transition occur at time 205 where the guardband times 212 and 213 from the ideal point to the data transitions are equal and maximum. If the clock 209 sample point 205 moved to the left more than guardband 212, then errors may occur. Likewise, if the clock sample point 205 moved right more than guardband 213, then errors may occur. Using this criteria it can be said that positioning data 200 relative to clock 209 as shown would have maximized the eye pattern window for detecting the logic states of data 200. If the clock generating clock edge 209 was asymmetrical or had timing jitter, then the effective eye window size would be diminished by the clock asymmetry and the jitter.

FIG. 3 illustrates exemplary waveforms for clock signals 150 and 151 wherein the data signals have edge transitions synchronous with the clock signals. When the data signals have transitions (data signal transitions 120 and 121) synchronous with the propagating clocks 150 and 151 then the affect is seen in increased edge timing jitter 320. This timing jitter will reduce the eye window illustrated by times 212 and 213 in FIG. 2. When differential receiver 116 converts the clock signals 150 and 151 into a single ended output 135, this timing jitter remains part of the received clock characteristics.

Figure 4:
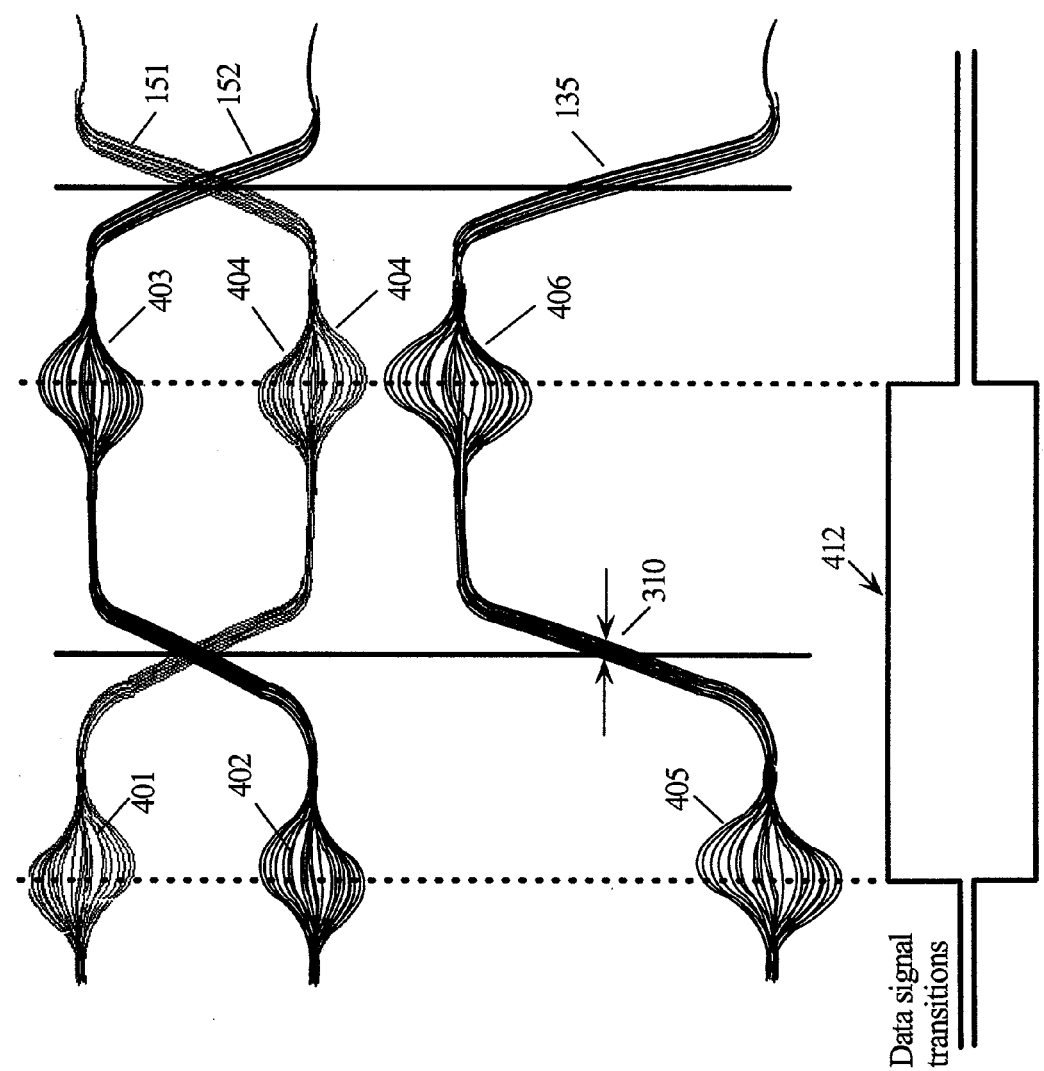
FIG. 4; illustrates clock waveforms of a shifted clock according to an embodiment of the present invention.

FIG. 4 illustrates waveforms for clock signals 150 and 151 when the propagating clock signals are shifted such that the data signal transitions 412 occur when the clock signals are at a logic one or logic zero state according to embodiments of the present invention. In this case, the clock signals 150 and 151, arriving at the receivers, has coupled noise 401-404 shifted away from the clock edge transitions. The output of differential receiver 116 has noticeable less edge timing jitter 310 when compared to the normal condition shown in FIG. 3.

Figure 5:
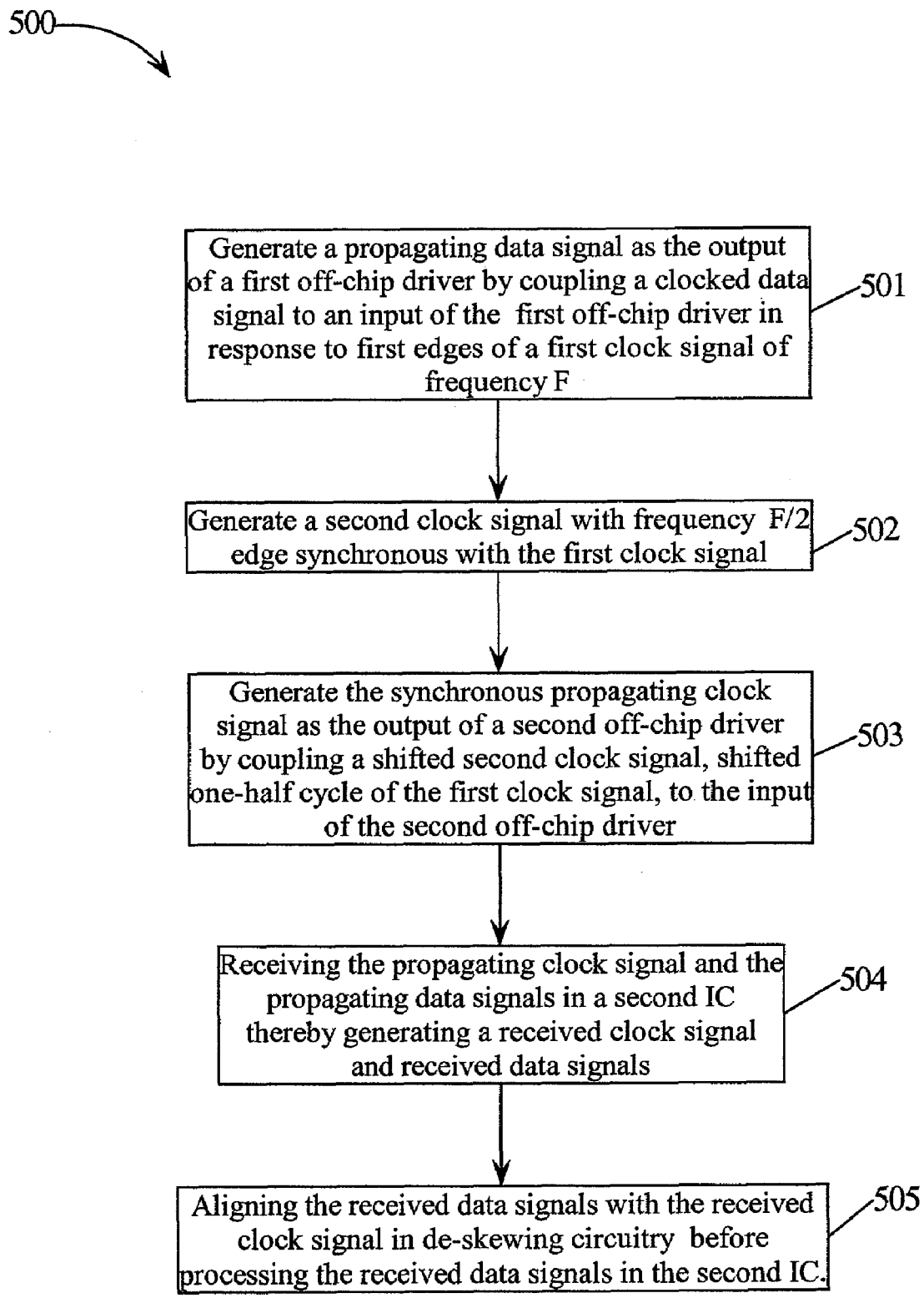
FIG. 5 is a flow diagram of method steps used in embodiments of the present invention.

FIG. 5 is a flow diagram of method steps used in embodiments of the present invention. In step 501, a propagating data signal in a parallel data and clock path is generated as the output of a first off-chip driver by coupling a clocked data signal to the input of the first off-chip driver in response to first edges of a first clock signal of frequency F. This means that the data signal only has transitions occurring on either positive or negative going edge transitions. In step 502, a second clock signal is generated with a frequency F/2 where the clock edges of the second clock signal are synchronous with the first edges of the first clock signal. In step 503, a synchronous propagating clock signal is generated as the output of a second off-chip driver by coupling a shifted second clock signal, formed by shifting the second clock signal by one-half cycle of the first clock signal, to the input of the second off-chip driver. In step 504, the propagating clock signal and the propagating data signals are received in a second IC thereby generating received data and clock signals. In step 505, the received data signals and the received clock signs are aligned to maximize an eye window of the data signals before the received data signals are processed by the second IC.

Figure 6:
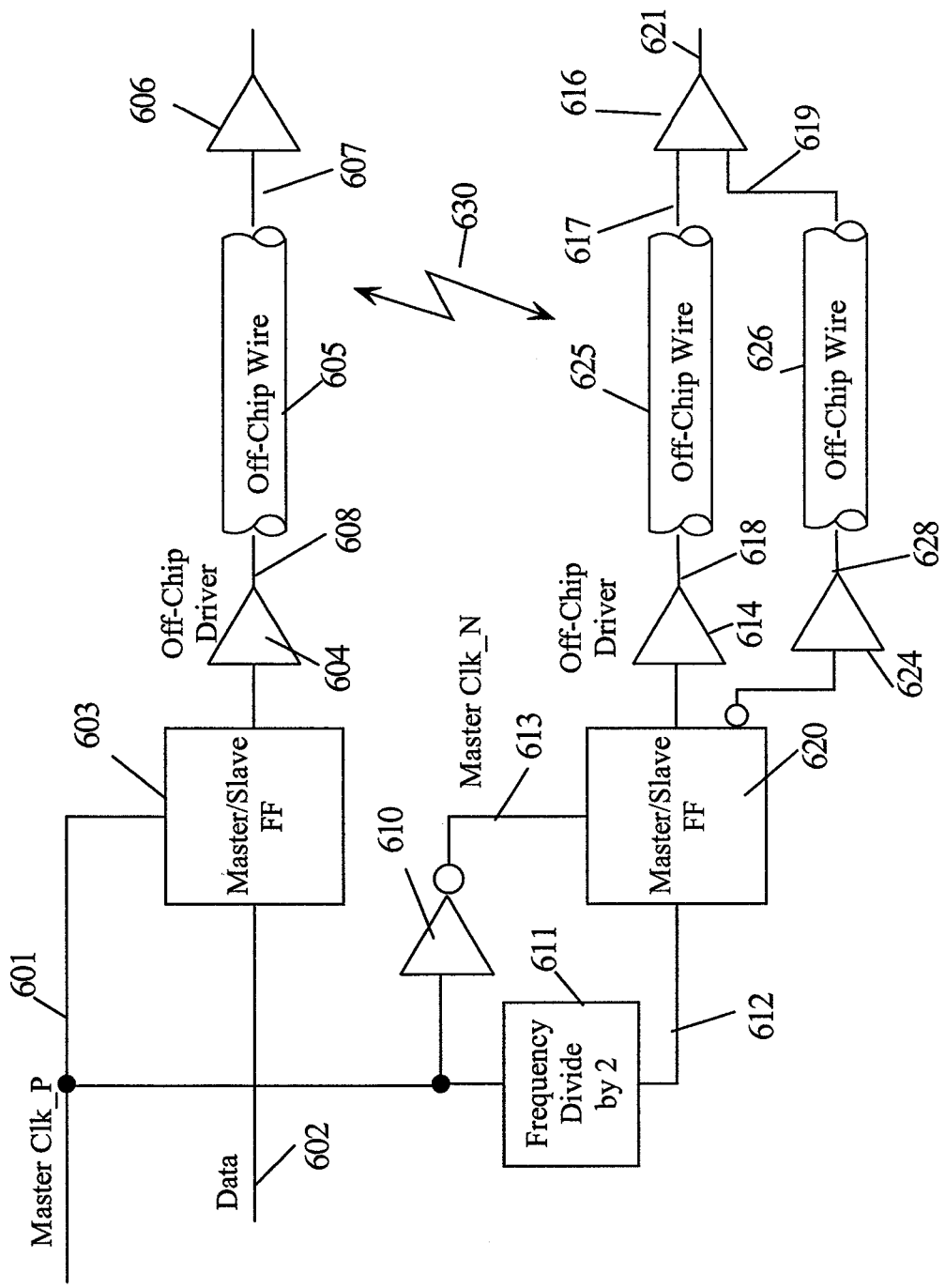
FIG. 6 is a circuit block diagram parallel data and differential clock lines wherein a master/slave FF is used to shift the propagating clock.

FIG. 6 is a circuit diagram for shifting the second clock signal to form the shifted second clock signal according to embodiments of the present invention. A master clock signal 601 of frequency F is used to clock a master/slave FF 603. It is understood that master/slave FF 603 comprises a master latch clocked by master Clk_P 601 and a slave latch clocked by the complement of master Clk_P 601. Master/slave FF 603 synchronizes data signal 602 such that edge transitions of data signal 602 occur only at the positive edges of master Clk_P 601. The output of master/slave FF 603 is coupled to off-chip driver 604 whose output generates propagating data signal 608. Propagating data signal 608 is transmitted over transmission line 605 to receiver 606.

Master Clk_P 601 is frequency divided by two in 611 to generate a second clock signal of frequency F/2. Likewise, master Clk_P is inverted by inverter 610 to generate master Clk_N 613 which is used to clock master/slave FF 620. The second clock signal is the "data" input to master/slave FF 620. This circuitry assures that the propagating clock signal generated at the output of master/slave FF 620 is shifter one-have cycle of master Clk_P 601. The normal second clock signal is coupled to off-chip driver 614 and the complement second clock signal is coupled to off-chip driver 624. In this manner differential signal as shown in FIG. 4 are transmitter over transmission lines 625 and 626 to differential receiver 616 producing a clock signal at output 621 similar to signal 135 shown in FIG. 4 wherein the coupled noise (e.g., 401-404 in FIG. 4) due to the data signal transitions is shifted away from the second clock signal transitions improving the timing jitter of the clock signals.

Figure 7:
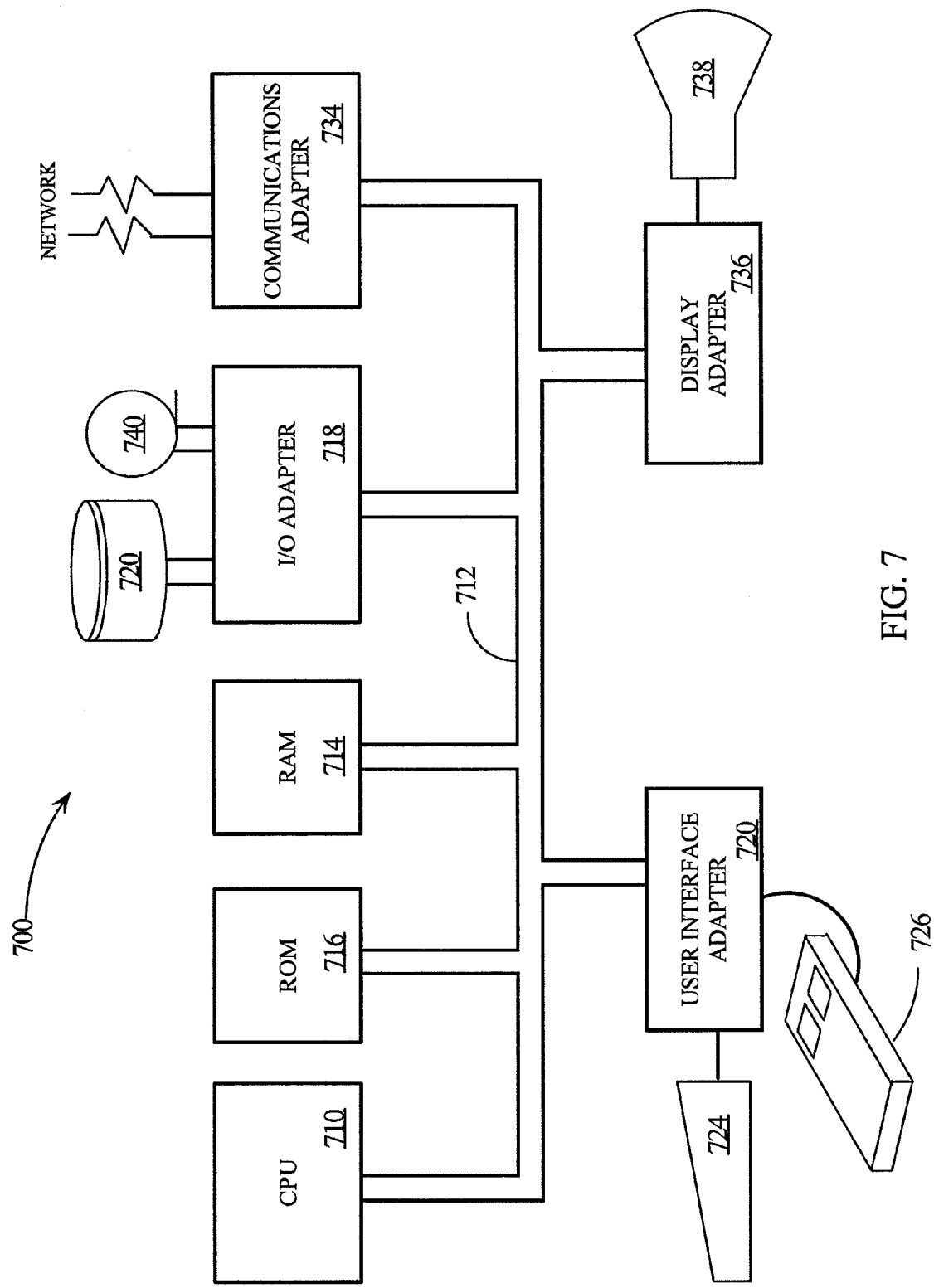
FIG. 7 is a block diagram of a data processing system suitable for practicing inventive features of the present invention.

FIG. 7 is a high level functional block diagram of a representative data processing system 700 suitable for practicing the principles of the present invention. Data processing system 700 includes a central processing system (CPU) 710 operating in conjunction with a system bus 712. System bus 712 operates in accordance with a standard bus protocol, such as the ISA protocol, compatible with CPU 710. CPU 710 operates in conjunction with electronically erasable programmable read-only memory (EEPROM) 716 and random access memory (RAM) 714. Among other things, EEPROM 716 supports storage of the Basic Input Output System (BIOS) data and recovery code. RAM 714 includes, DRAM (Dynamic Random Access Memory) system memory and SRAM (Static Random Access Memory) external cache. I/O Adapter 718 allows for an interconnection between the devices on system bus 712 and external peripherals, such as mass storage devices (e.g., a hard drive, floppy drive or CD/ROM drive), or a printer 740. A peripheral device 720 is, for example, coupled to a peripheral control interface (PCI) bus, and I/O adapter 718, therefore, may be a PCI bus bridge. User interface adapter 722 couples various user input devices, such as a keyboard 724 or mouse 726 to the processing devices on bus 712. Display 738 which may be, for example, a cathode ray tube (CRT), liquid crystal display (LCD) or similar conventional display units. Display adapter 736 may include, among other things, a conventional display controller and frame buffer memory. Data processing system 700 may be selectively coupled to a computer or telecommunications network 741 through communications adapter 734. Communications adapter 734 may include, for example, a modem for connection to a telecom network and/or hardware and software for connecting to a computer network such as a local area network (LAN) or a wide area network (WAN). CPU 710 and other components of data processing system 700 may contain logic circuitry in two or more integrated circuit chips that are separated by a significant distance relative to their communication frequency such that a shifted propagating clock is used to reduce clock edge jitter and maximize the eye window of data signals according to embodiments of the present invention.

Figure 8:
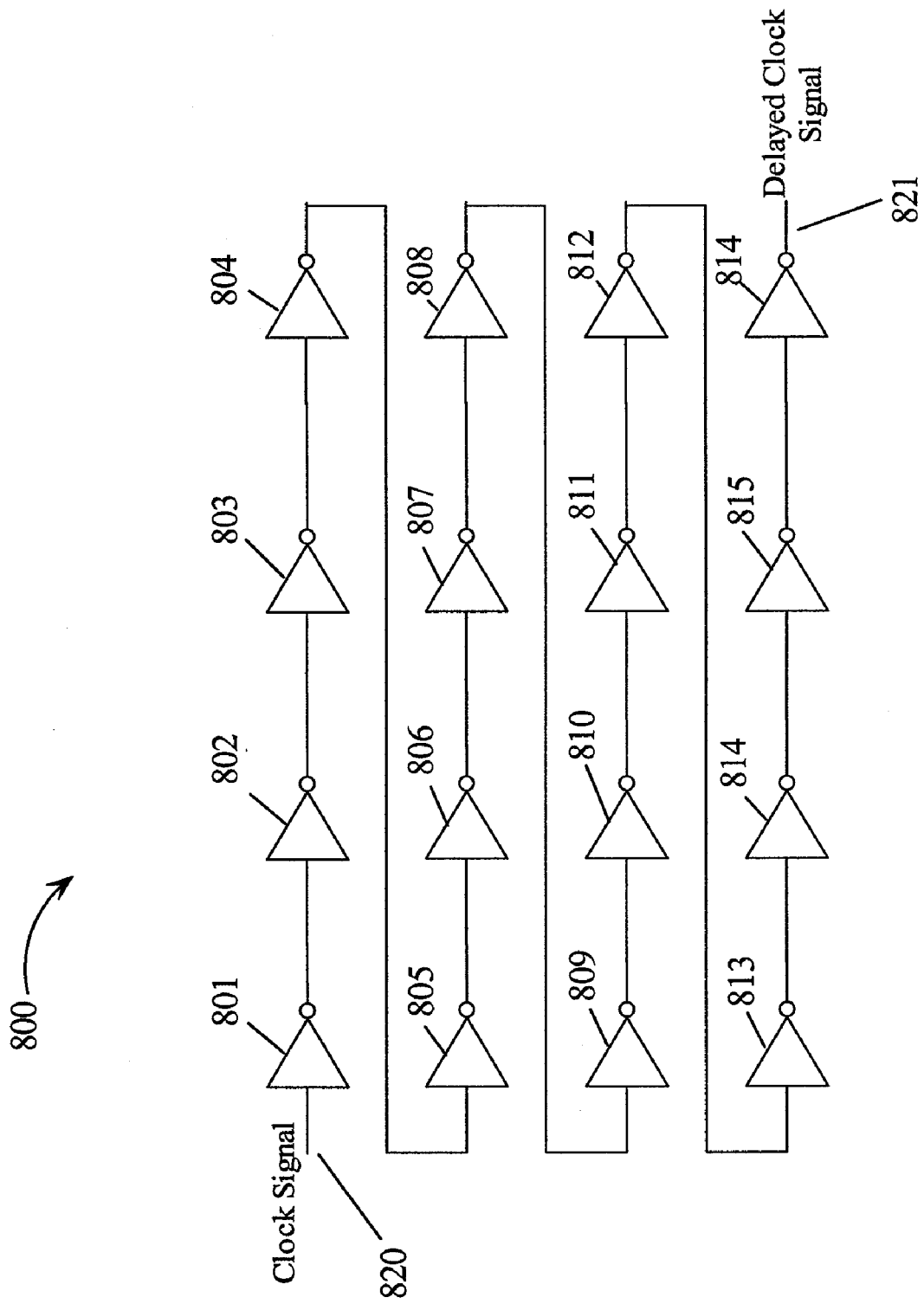
FIG. 8 is a circuit diagram of an inverter chain suitable for shifting the clock signal according to embodiment of the present invention.

FIG. 8 illustrates an inverter delaying circuit 800 that is configured to proved a controller amount of delay to clock signal 820 to generate shifted of delayed clock signal 821 according to embodiments of the present invention. In this example 12 inverters 801-814 are used to generated a fixed delay. It is under stood that delayed clock 821 may be generated by selecting any one of the outputs of inverters 801-814 in a selection circuit (not shown). Delay circuit 800 may used to generate the propagating clock to reduce clock timing jitter according to embodiment of the present invention.

Figure 9:
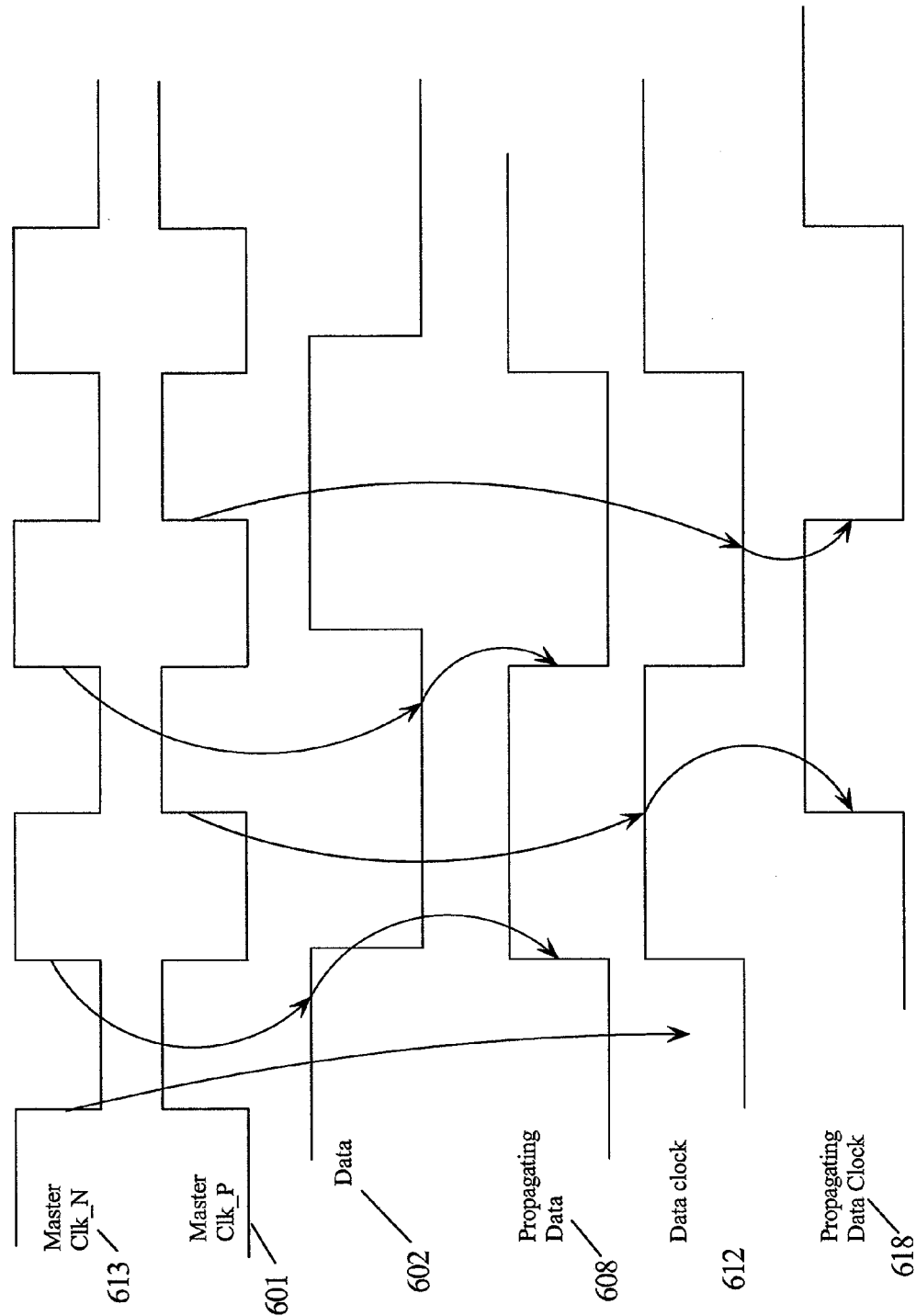
FIG. 9 is a timing diagram of clock and data signals according to embodiments of the present invention.

FIG. 9 is a timing diagram of signals from the circuit of FIG. 6. Data signal 602 is clocked with master Clk_P 601 and master Clk_N 613 to generate the propagating data signal 608. Likewise data clock 612 is generated by frequency dividing master Clk_P 601 in frequency divider 611. Data clock 612 is clocked in master/slave FF 620 such that the master latch is clocked by master Clk_N 613 and the slave latch is clocked by master Clk_P 601 (inversion is internal to master/slave FF 620). In this manner, a shifted clock is generated as propagating data clock 618 to insure that the propagating data signal has edge transitions shifted away form the edge transitions of the propagating clock signals 618 and 628 to improve clock timing jitter according to an embodiment of the present invention.

Although the present invention and its advantages have been described in detail, it should be understood that various changes, substitutions and alterations can be made herein without departing from the spirit and scope of the invention as defined by the appended claims.

What is claimed is:

1. A data processing system comprising:
    a central processing unit (CPU);
    a random access memory (RAM) coupled to the CPU; and
    a bus for coupling a first and second IC in the CPU using
        bus circuitry to reduce the cross-talk induced edge jitter
        within a plurality of propagating data signals transmitted over data transmission lines and a synchronous propagating clock signal transmitted over a clock transmission line, the bus circuitry having a first circuit for coupling states of each of a plurality of data signals to an input of a data off-chip driver (OCD) in response to a first logic state transition of a first clock signal of frequency F thereby generating the propagating data signal as the output of the data OCD coupled to one of the data transmission lines, circuitry for generating a second clock signal with a frequency F/2 from the first clock signal, a second circuit for shifting the second clock signal a time substantially equal to one-half cycle of the first clock signal thereby generating a shifted second clock signal by, and circuitry for coupling the shifted second clock signal to the input of a clock OCD that generates the propagating clock signal as an output of the clock OCD coupled to the clock transmission line, wherein transition generated noise coupled from the data transmission lines to the clock transmission line occurs between positive going and negative going logic state transitions of the propagating clock signal.

2. The data processing system 1, further comprising:
    circuitry in the second IC for receiving the propagating clock signal and the propagating data signals from the first IC thereby generating a received clock signal and received data signals; and
    circuitry in the second IC for aligning the received data signals with the received clock signal in de-skewing circuitry before processing the received data signals.

3. The data processing system of claim 1, wherein the first circuit is a master/slave flip flop (FF) having an input coupled to the data signal, an output coupled to the input of the data OCD, the master latch clocked with the first clock signal and the slave latch clocked with a complement of the first clock signal.

4. The data processing system of claim 3, wherein the shifted second clock signal is generated by delaying the second clock signal one-half cycle of the first clock signal using a programmable delay line as the second circuit.

5. The data processing system of claim 4, wherein the programmable delay line is configured as a series connection of a multiplicity of inverters having the second clock signal as the input of a first inverter and an output of one of the multiplicity of inverters selected as the shifted second clock signal.

6. The data processing system of claim 3, wherein the second clock signal is generated by frequency dividing the first clock signal by two.

7. The data processing system of claim 6, wherein the second circuit is a master/slave flip flop (FF) having an input coupled to the second clock signal, an output coupled to the input of the clock OCD, the master latch clocked with the complement of the first clock signal and the slave latch clocked with the first clock signal.

8. The data processing system of claim 2, wherein the de-skewing circuitry shifts the received data signals so that logic state transitions of the received clock signal occur substantially in the middle of an eye diagram describing a signal quality of the received data signal.

9. The data processing system of claim 1, wherein the data transmission lines and the clock transmission line are substantially parallel.

* * * * *